Jan. 15, 1935. J. KLEFFMAN 1,987,831
TRAP
Filed May 22, 1933
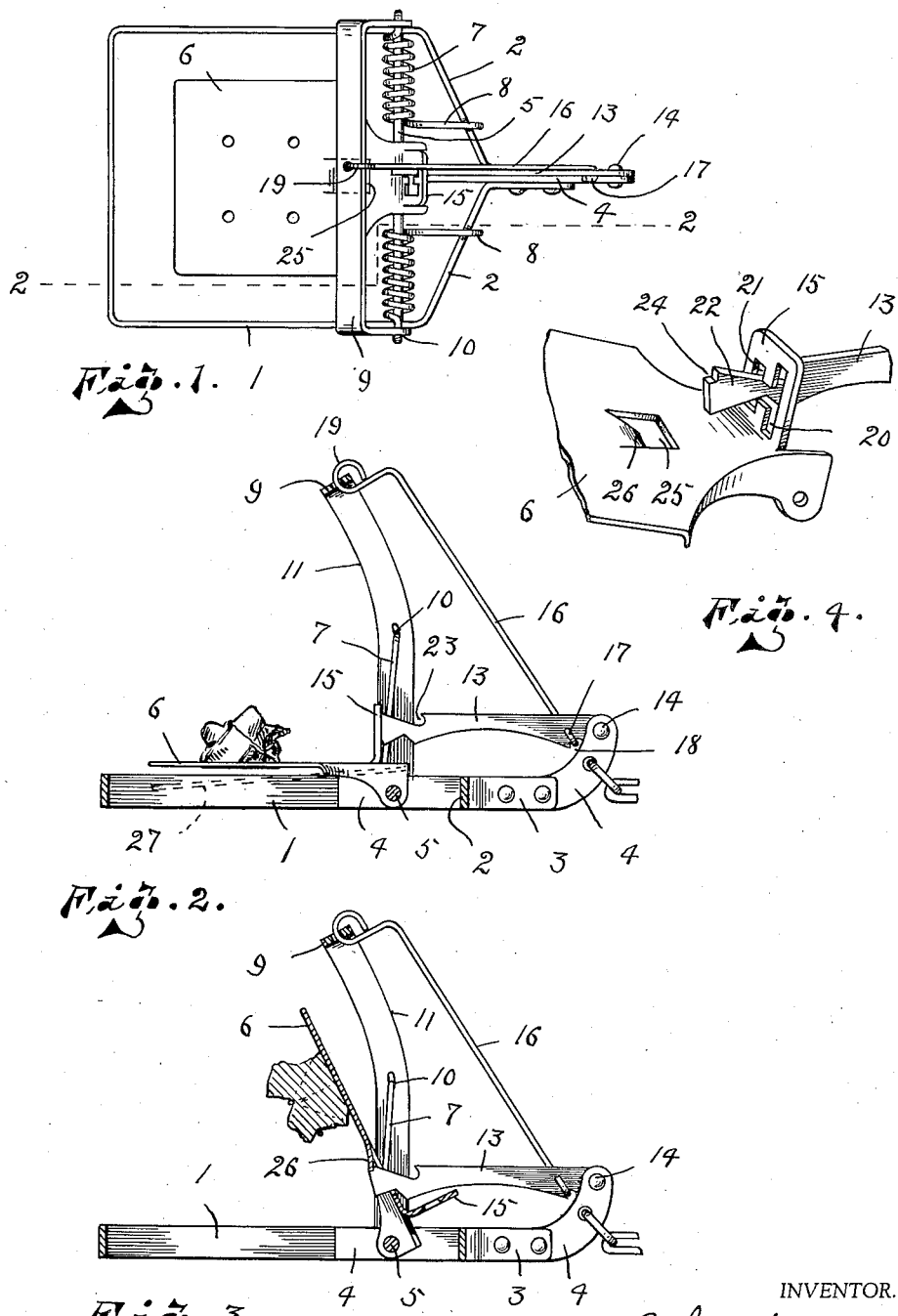
INVENTOR.
BY John Kleffman.
ATTORNEY.

Patented Jan. 15, 1935

1,987,831

UNITED STATES PATENT OFFICE 1,987,831

TRAP

John Kleffman, Hibbing, Minn.

Application May 22, 1933, Serial No. 672,147

3 Claims. (Cl. 43—81)

This invention relates to animal traps and may be conveniently referred to as a spring trap, indicating that type in which the animal actuates a pan by contact therewith which springs a trigger and the animal is caught between the catching bar and base portion of the trap; somewhat similar types of traps being well known in the art.

The principal object of my present invention is to provide a more practical, simple, and efficient trap of this type than heretofore known, and one especially adapted for instantly killing the animal caught as well as one susceptible of being set either in horizontal or vertical position.

Other objects and advantages of the invention will appear in the following description thereof.

Referring now to the accompanying drawing, forming part of this application, and wherein like reference characters indicate like parts:

Figure 1 is a plan view of the trap as it appears in set position and with the bait on top of the pan.

Figure 2 is a vertical section on the line 2—2 Figure 1.

Figure 3 is a vertical section on the line 2—2, Figure 1, but showing the pan in its upright position with the bait attached to the under side thereof, and in section.

Figure 4 is an enlarged perspective view of the innermost end of the pan.

1 represents the open frame-like body portion of the trap, preferably rectangular in shape and made of suitable bar metal. The free ends of this body portion are brought towards each other diagonally as at 2 and then bent substantially at an angle of 45° forming two spaced termini 3 intermediate of which is riveted or otherwise fastened the handle-like trigger holding bar 4. The innermost end of this bar 4 is mounted upon the transverse rod or shaft 5 spanning that end of the body portion adjacent the handle and mounted in the extreme opposite corners thereof. This shaft carries centrally and pivotally the trip pan 6 upon opposite sides of which are mounted the expansive helical torsion springs 7. One end of each of these springs extends at right angles to the shaft as at 8 and is made to overlap the diagonal portion 2 of the body, while the opposite end of each spring extends also at right angles to the shaft and is hooked each into its respective side member of the catching bar 9, as at 10, so that when the catching bar is forced away from the body portion (the ends of which are pivotally attached to said body portion on the extreme ends of the shaft 5) to set position, it will tend to contract the springs 7, and, when subsequently sprung, the expansive force of said springs will affect the functioning of the trap.

The catching bar is novel in that the side members of the free end thereof are curved or arcuate in form as at 11, the same being at the opposite end as is obvious of the transverse straight bar-like terminus, such shape being for the express purpose of preventing the sides of the bar when the trap is sprung from throwing the animal, otherwise about to be caught, free of the trap, for example in the event of an animal engaging the pan from one side thereof; the action of the catching bar thus constructed being to grab or catch, rather than expel it from the trap.

The trigger for holding the trap in set position is illustrated at 13, pivotally attached as at 14 to the upwardly turned end of the handle 4, the opposite end of the trigger 13 being peculiar in shape for the double purpose of acting as a safety device as well as a trigger while in engagement with the upstanding end 15 of the pan which will be described later.

A holding rod 16 is hooked at one end as at 17 for engagement within the notch 18 in the trigger adjacent the pivotal end thereof, while the opposite end of the rod 16 is pivotally connected as by the bight 19 to the killing bar, and at this connection it is somewhat offset so as to freely permit of the killing bar passing outwardly of and slightly beyond the transverse end of the frame 1 when the trap is sprung; it being obvious that in this type of trap the killing bar stands when set at substantially right angles to the frame member.

The upstanding end 15 of the pan is provided with a pair of rectangularly shaped slots 20 and 21 in parallel relation, one somewhat longer than the other and united centrally as by a horizontal slot of a width to permit the free passage of the neck or narrowest portion adjacent the head 22 of the trigger. The head 22 is of a size to readily pass through the major slot 20, but cannot pass through the minor slot 21, so that prior to the setting of the trap when the pan is raised the trigger plate 15 of the trap is readily slipped over the head 22 of the trigger, then the trigger having free limited lateral movement may be slipped over through the connecting slot into the minor slot 21 from which it cannot be moved by lowering of the pan but the latter is permitted some limited movement for purposes hereinafter described. At the base of the neck of the head 22 is formed a notch 23, the knuckle of which extends upwardly to engage or abut the upper end of the trigger plate when the pan is raised to its uppermost limit, and simultaneously with this movement the chin or lower angle of the head will engage the flat surface of the pan, and when the assembly is thus adjusted it is to be noted that the neck of the trigger will be in horizontal alignment with the connecting slot and thus may be readily slipped from one slot into the other at will and without any regard to its position other than the pan is held up for such engagement. This is deemed an essential feature in the setting of the trap, and the upper surface of the neck and head is inclined so that when the holding bar is causing an upward pull on the holding rod 16, thus causing a stress upwardly on the trigger 13, the tendency is to keep the pan at such upward extreme position for convenient slipping sidewise of the free end of the trigger from the safety slot 21 to the setting slot 20. This however is not practiced except at the time of setting the trap and subsequent to the positioning of the trigger and pan for safety.

After this initial positioning has taken place then the killing bar is grasped in one hand with the front end of the frame in the other hand and they are forcibly drawn apart against the action of the spring 7, when the hooked end of the holding rod 16 is engaged beneath the trigger 13 and slid along the under arcuate surface thereof until it catches in the notch 18, where it is safely held until final setting of the trap takes place. This latter action is accomplished by simply sliding the head end of the trigger as previously described over laterally out of the safety slot 21 into the setting slot 20, the trigger being necessarily lowered slightly to register with the connecting slot therebetween, and which engagement may be accomplished wholly rearwardly of the killing bar, eliminating all possibility of injury from the accidental springing of the trap.

A hole 25 is struck from the pan adjacent its pivotal end and centrally thereof the tongue 26 which extends inwardly and beneath the pan acting as a means for engagement with the notch 24 in the forehead of the trigger, when it is desired to set the pan in its uppermost position, for example, when the trap is hung on a tree or post which is common practice with such a trap, or when it is desired to conceal the upstanding portions of the trap for example in the runway of an animal and having only the bait extending from one side of the runway.

This method of placing the bait upon the under side of the pan, being comparatively little practiced, it is deemed non-essential that safety means be provided for such; however it is obvious that a pair of notches such as illustrated in the trigger plate may be made directly in the body of the pan, in lieu of the notch or hole 25.

It will be noted furthermore that the inner end of the bar 4 is made to extend inwardly of the shaft 5 to act as a bar or stop for the pan when manipulating the bait thereupon when fully gravitated, as indicated in dotted lines at 27.

Having thus described my invention, what I claim and desire to secure by Letters Patent, is:

1. A spring trap of the type described having a bait holding pan and cooperative trigger therefor, means whereby the pan and trigger may be set to safety position before the jaws of the trap are opened, means whereby the opened jaws are held in such position by the trigger, and means whereby to change the relation of the pan and trigger to set position.

2. In a spring trap of the kind described, a bait holding pan provided with holes therein and a cooperative trigger therefor, characterized by the trigger having a free and wedge-shaped end, said end being selectively adjustable to lie in one of said holes for setting of the trap, and another of said holes being of a size to cooperate with the free end of said trigger to insure safety in setting of the trap.

3. In a spring trap of the kind described, a bait holding pan having holes therein and cooperative trigger therefor, said trigger having a free and wedge shaped end, means whereby said end may be moved to lie in one of said holes for safety while the trap is being set, and means whereby said trigger may be moved to set position in another of said holes without springing the trap.

JOHN KLEFFMAN.